United States Patent
Lin et al.

(10) Patent No.: US 11,873,060 B2
(45) Date of Patent: Jan. 16, 2024

(54) BIKE AND BELT TENSIONER THEREOF

(71) Applicant: MOBILITY HOLDINGS, LIMITED, Causeway Bay (HK)

(72) Inventors: Eric Yi-Hung Lin, Causeway Bay (HK); Joakim Uimonen, Causeway Bay (HK)

(73) Assignee: MOBILITY HOLDINGS, LIMITED, Causeway Bay (HK)

( * ) Notice: Subject to any disclaimer, the term of this patent is extended or adjusted under 35 U.S.C. 154(b) by 808 days.

(21) Appl. No.: 16/985,999

(22) Filed: Aug. 5, 2020

(65) Prior Publication Data
US 2022/0041247 A1   Feb. 10, 2022

(51) Int. Cl.
*B62M 9/16* (2006.01)
*F16H 7/12* (2006.01)
*F16H 7/08* (2006.01)

(52) U.S. Cl.
CPC .............. *B62M 9/16* (2013.01); *F16H 7/129* (2013.01); *F16H 2007/088* (2013.01); *F16H 2007/0865* (2013.01); *F16H 2007/0893* (2013.01); *F16H 2007/0897* (2013.01)

(58) Field of Classification Search
CPC ..................................................... B62M 9/16
See application file for complete search history.

(56) References Cited

U.S. PATENT DOCUMENTS

| | | | | |
|---|---|---|---|---|
| 4,069,719 A | * | 1/1978 | Cancilla | B62M 9/16 474/134 |
| 4,299,582 A | * | 11/1981 | Leitner | B62M 9/16 474/111 |
| 4,479,660 A | | 10/1984 | Pattison | |
| 5,221,236 A | * | 6/1993 | Raymer | B62M 9/16 474/134 |
| 11,688,898 B2 | * | 6/2023 | Hoefner | F16B 5/06 429/96 |
| 2022/0055713 A1 | * | 2/2022 | Halfer | B62K 25/283 |

FOREIGN PATENT DOCUMENTS

| | | | | |
|---|---|---|---|---|
| CN | 115288501 B | * | 5/2023 | |
| CN | 219001877 U | * | 5/2023 | |
| DE | 102018215451 A1 | | 3/2020 | |
| KR | 20140013974 A | * | 2/2014 | |
| KR | 20150052754 A | * | 5/2015 | |

* cited by examiner

*Primary Examiner* — Kevin Hurley
(74) *Attorney, Agent, or Firm* — MUNCY, GEISSLER, OLDS & LOWE, P.C.

(57) ABSTRACT

A belt tensioner for use with a bike is provided. The bike includes a frame and a belt. The frame includes a chain stay and a seat stay having a top surface and bottom surface. The belt tensioner includes a tensioner skeleton, a roller and a tension regulator. The tensioner skeleton is pivotally connected to the chain stay or the seat stay. An included angle is formed between the tensioner skeleton and chain stay or the seat stay. The roller is pivotally connected to the tensioner skeleton and in contact with the belt. The tension regulator presses against the belt to adjust tension of the belt. The tension regulator is disposed at an end of the tensioner skeleton, and the end of the tensioner skeleton is positioned distal to the bottom surface.

13 Claims, 4 Drawing Sheets

BIKE AND BELT TENSIONER THEREOF

BACKGROUND OF THE INVENTION

Field of the Invention

The present disclosure relates to a bike and a belt tensioner thereof and, more particularly, to a bike and a belt tensioner thereof to allow a belt to connect to a rear wheel and to be tightened from the same side of a chain stay or a seat stay.

Description of the Prior Art

A conventional bike has a chain stay, rear wheel, ring, pedals, cranks and circular belt. The rear wheel is mounted on the chain stay. The pedals are mounted to the cranks. The cranks are connected to the ring. The circular belt connects the ring and the rear wheel. When a user presses the pedals with his/her feet, the pedals drive the ring to rotate such that the circular belt circulates and drives the rear wheel to rotate, causing the bike to move.

The conventional bike requires the circular belt to extend to above and below the chain stay in order to connect to the rear wheel from above and below the chain stay. However, constituent elements of the bike are densely distributed in the vicinity of the point located on the lower side of the chain stay and positioned proximate to the rear wheel. As a result, there is no space for allowing the circular belt to pass, and the bike would have to be designed with an expensive opening to allow the belt to pass through. Consequently, the design cost of the conventional bike is high to enable the circular belt to connect smoothly to the rear wheel from the lower side of the chain stay.

Therefore, it is imperative to provide a bike that allows a circular belt to extend only from above a chain stay so as to connect to a rear wheel.

SUMMARY OF THE INVENTION

It is an objective of the present disclosure to provide a belt tensioner that allows a belt to connect to a rear wheel and to be tightened from the same side of a chain stay or a seat stay.

In order to achieve the above and other objectives, the present disclosure provides a belt tensioner for use with a bike. The bike comprises a frame and a belt. The frame comprises a chain stay or a seat stay. The chain stay and the seat stay respectively comprises a top surface and a bottom surface. The belt tensioner comprises a tensioner skeleton, a roller and a tension regulator. The tensioner skeleton is pivotally connected to the chain stay or the seat stay. An included angle is formed between the tensioner skeleton and the chain stay or the seat stay. The roller is pivotally connected to the tensioner skeleton and is in contact with the belt. The tension regulator presses against the belt and thus adjusts a tension of the belt. The tension regulator is disposed at one end of the tensioner skeleton, and the end of the tensioner skeleton is positioned distal to the bottom surface. Part of the belt is in contact with the tension regulator. The vertical height of the contact part of the belt is greater than the height of the top surface of the chain stay.

In an embodiment of the present disclosure, the tensioner skeleton further comprises a first link and a second link. The first link is disposed at the chain stay or the seat stay and has a first extension direction. The second link comprises a first end. The first end is pivotally connected to the first link. When the first end is pivotally connected to the first link, the second link has a second extension direction. An included angle is formed between the first extension direction and the second extension direction.

In an embodiment of the present disclosure, the second link comprises a second end, and the second end is pivotally connected to the roller.

The tension regulator further comprises a positioning holder and an elevating stud. The positioning holder is connected to the tensioner skeleton. The elevating stud moves along the positioning holder. The elevating stud is able to increase the tension of the belt by moving upward to press against the belt.

In an embodiment of the present disclosure, the second link further comprises a through hole, and the elevating stud passes through the through hole to press against the belt.

In an embodiment of the present disclosure, the belt tensioner stretches the belt along the second extension direction such that the belt extends obliquely from the bottom surface to the top surface. Part of the belt is in contact with the tension regulator. The vertical height of the contact part of the belt is greater than the height of the top surface when the tension regulator presses against the belt.

In an embodiment of the present disclosure, the included angle ranges from 10 to 80 degrees.

Another objective of the present disclosure is to provide a bike that allows a belt to connect to a rear wheel and to be tightened from the same side of a chain stay or a seat stay.

In order to achieve the above and other objectives, the present disclosure provides a bike comprising a frame and a belt. The frame comprises a chain stay and a seat stay. The chain stay and the seat stay respectively comprises a top surface, a bottom surface and a connection surface. Two opposing ends of the connection surface are connected to the top surface and the bottom surface, respectively. According to the present disclosure, the bike further comprises a belt tensioner, and the belt tensioner is disposed at the chain stay or the seat stay. The belt tensioner comprises a tensioner skeleton, a roller and a tension regulator. The tensioner skeleton is disposed on a connection surface. The roller is pivotally connected to the tensioner skeleton and in contact with the belt. The tension regulator presses against the belt and thus adjusts a tension of the belt. The tension regulator is disposed at an end of the tensioner skeleton, and the end of the tensioner skeleton is positioned distal to the bottom surface. Part of the belt is in contact with the tension regulator. The vertical height of the contact part of the belt is greater than the height of the top surface of the chain stay when the tension regulator presses against the belt.

In an embodiment of the present disclosure, the bike comprises a lateral platform, and the belt extends from the top surface to the lateral platform so as to connect to the rear wheel.

DETAILED DESCRIPTION OF THE EMBODIMENTS

Objectives, features, and advantages of the present disclosure are hereunder illustrated with specific embodiments, depicted with drawings, and described below.

Figure 1:
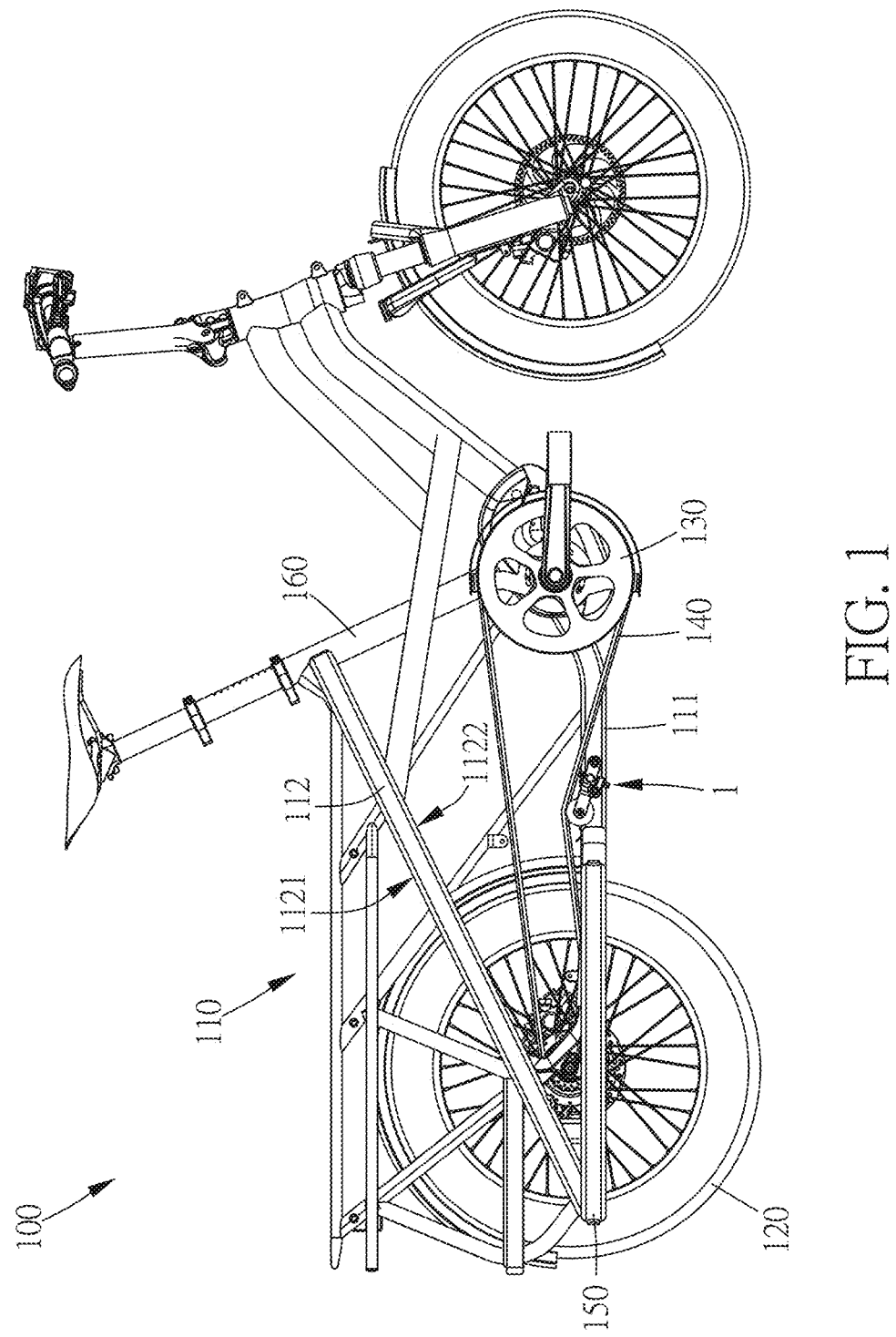
FIG. 1 is a schematic view of a bike in an embodiment of the present disclosure.
Figure 2:
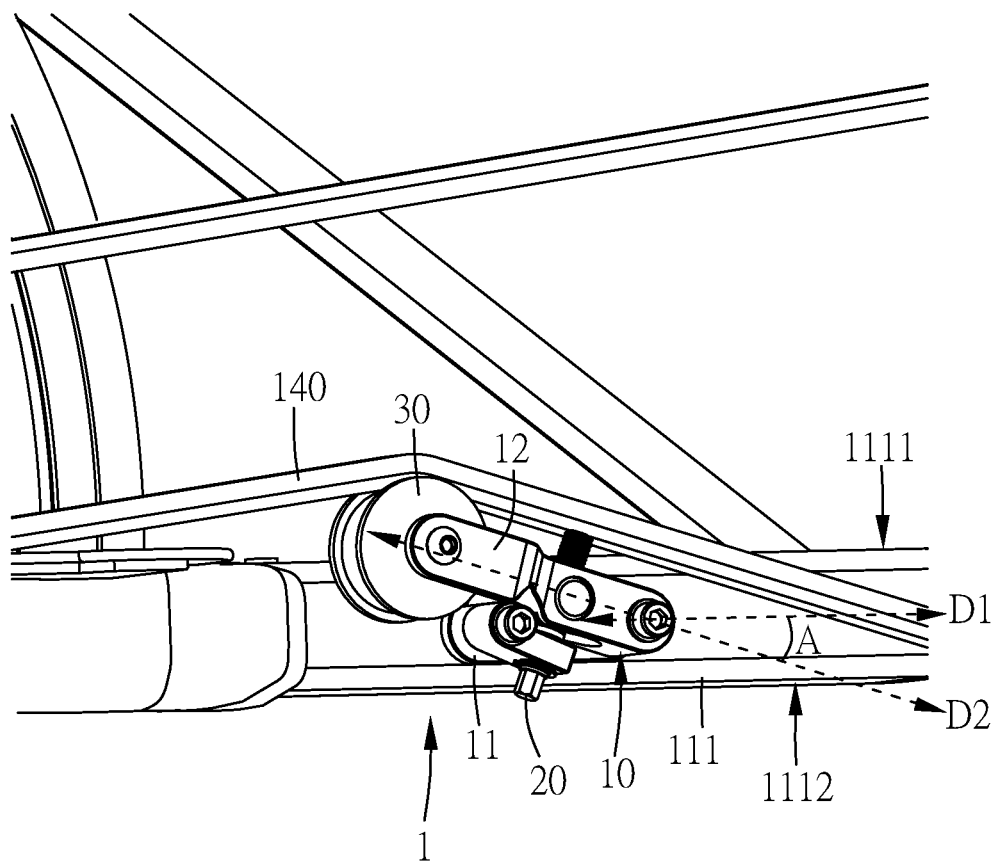
FIG. 2 is a schematic view of a belt tensioner mounted on a chain stay of the chain stay in an embodiment of the present disclosure.
Figure 3:
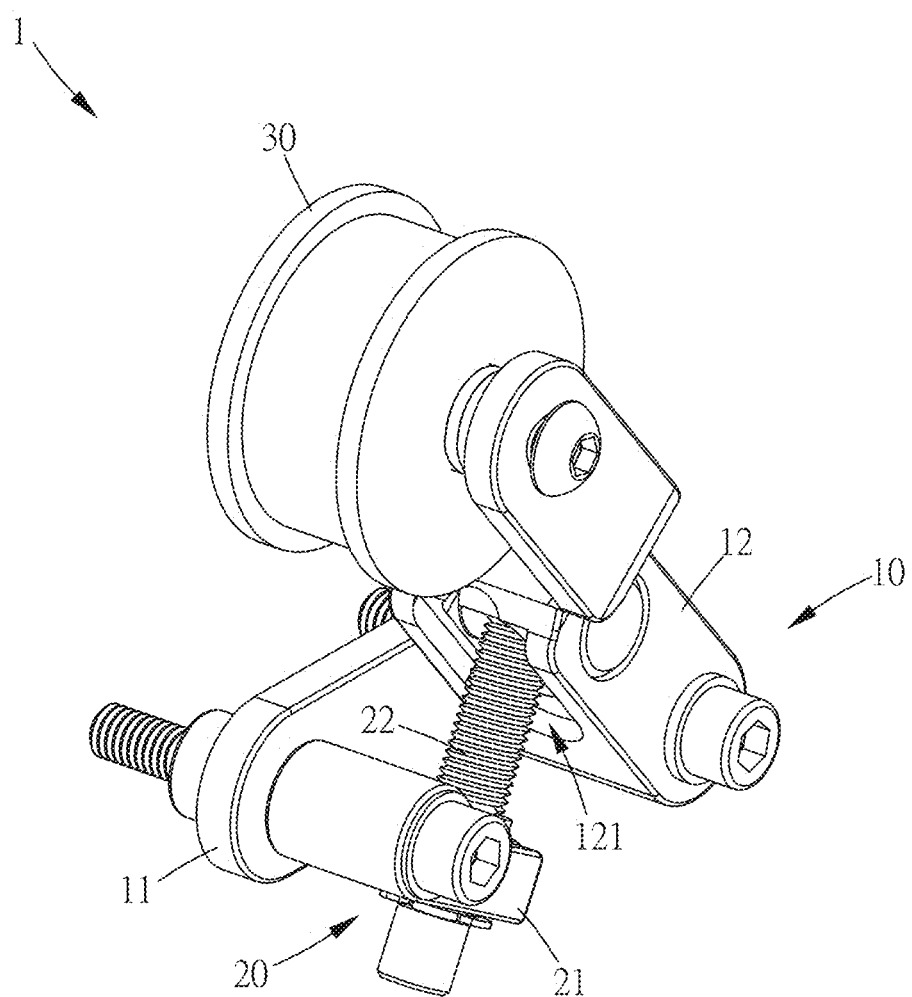
FIG. 3 is a schematic view of the belt tensioner in an embodiment of the present disclosure.
Figure 4:
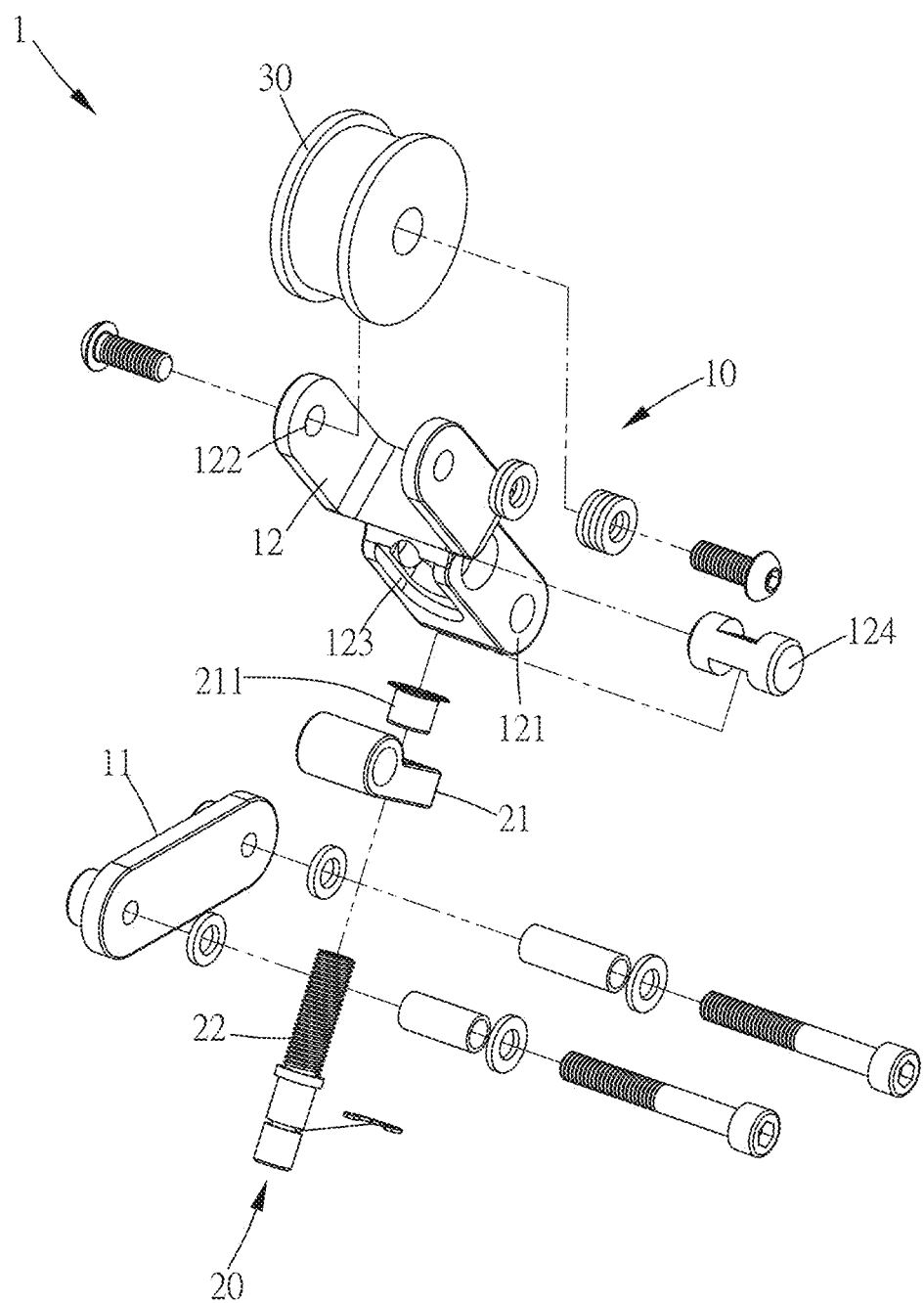
FIG. 4 is an exploded view of the belt tensioner in an embodiment of the present disclosure.

Referring to FIG. 1 through FIG. 4, a bike and a belt tensioner are provided in an embodiment of the present disclosure. FIG. 1 is a schematic view of a bike in an embodiment of the present disclosure. FIG. 2 is a schematic view of a belt tensioner mounted on a chain stay of the chain stay in an embodiment of the present disclosure. FIG. 3 is a schematic view of the belt tensioner in an embodiment of the present disclosure. FIG. 4 is an exploded view of the belt tensioner in an embodiment of the present disclosure.

As shown in FIG. 1 and FIG. 2, a bike 100 in an embodiment of the present disclosure comprises a frame 110, a rear wheel 120, a ring 130, a belt 140, a lateral platform 150, a seat tube 160 and a belt tensioner 1. The frame 110 comprises a chain stay 111 and a seat stay 112. The chain stay 111 is located at the lowermost point of the bike 100. The chain stay 111 extends along a first extension direction D1. The chain stay 111 comprises a top surface 1111 and a bottom surface 1112. The seat stay 112 comprises a top surface 1121 and a bottom surface 1122. The ring 130 is connected to the chain stay 111. The belt 140 is a circular cord which is connected to the rear wheel 120 and the ring 130. The lateral platform 150 is disposed on two sides of the rear wheel 120. The lateral platform 150 is of the same height as the chain stay 111. The seat tube 160 is connected to the chain stay 111. The ring 130 is disposed below the seat tube 160. The belt tensioner 1 not only enables the belt 140 to extend from above the chain stay 111 so as to be connected to the rear wheel 120 but also adjusts the tension of the belt 140. The belt tensioner 1 comprises a tensioner skeleton 10, a tension regulator 20 and a roller 30.

As shown in FIG. 2 through FIG. 4, in an embodiment of the present disclosure, the tensioner skeleton 10 changes the height of the roller 30 in order to stretch the belt 140. The tensioner skeleton 10 is pivotally connected to the chain stay 111. The tensioner skeleton 10 comprises a first link 11 and a second link 12. The first link 11 is pivotally connected to the chain stay 111 with a screw and a nut. One end of the second link 12 is pivotally connected to the first link 11 with a screw and a nut. The other end of the second link 12 is pivotally connected to the roller 30 with a screw and a nut. The first link 11 has a first extension direction D1. The second link 12 comprises a first end 121, a second end 122, a through hole 123 and a threading unit 124. The through hole 123 is penetrable by the tension regulator 20. The threading unit 124 in located in the through hole 123. An included angle A is formed between the second link 12 of the tensioner skeleton 10 and the chain stay 111. The first end 121 is pivotally connected to the first link 11. When the first end 121 is pivotally connected to the first link 11, the second link 12 has a second extension direction D2. The included angle A is formed between the first extension direction D1 and the second extension direction D2. The second end 122 is pivotally connected to the roller 30. Owing to the aforesaid pivotal connection, the first link 11 rotates relative to the chain stay 111, and the second link 12 rotates relative to the first link 11. Therefore, the included angle A is variable, and the overall height of the tensioner skeleton 10 is variable. The included angle A ranges from 10 to 80 degrees, but the present disclosure is not limited thereto; hence, the range of the included angle A is subject to changes as needed.

As shown in FIG. 2 through FIG. 4, in an embodiment of the present disclosure, the tension regulator 20 is connected to the tensioner skeleton 10 with a screw and a nut. The tension regulator 20 presses against the belt 140 so as to adjust a tension of the belt 140. The tension regulator 20 is disposed at an end of the tensioner skeleton 10, and the end of the tensioner skeleton 10 is positioned distal to the bottom surface 1112 of the chain stay 111. Part of the belt 140 is in contact with the tension regulator 20. The vertical height H of the contact part of the belt 140 is greater than the height of the top surface 1111 when the tension regulator 20 presses against the belt 140. The tension regulator 20 comprises a positioning holder 21 and an elevating stud 22. The positioning holder 21 is connected to the tensioner skeleton 10. The positioning holder 21 has a sliding bearing unit 211. The elevating stud 22 is threaded. The elevating stud 22 is movable relative to the positioning holder 21 because of the sliding bearing unit 211. The elevating stud 22 passes through the through hole 123, combines with the threading unit 124, and presses against the belt 140. The elevating stud 22 is able to increase the tension of the belt 140 by moving upward to press against the belt 140. Conversely, the elevating stud 22 is able to decrease the tension of the belt 140 by moving downward relative to the positioning holder 21.

As shown in FIG. 2 through FIG. 4, in an embodiment of the present disclosure, the roller 30 is pivotally connected to the tensioner skeleton 10 with a screw and a nut and is in contact with the belt 140. The roller 30 enables the belt 140 to roll smoothly. Since the overall height of the tensioner skeleton 10 is variable, the roller 30 can vary in height to press against or move away from the belt 140, thereby varying the tension of the belt 140.

As shown in FIG. 1 and FIG. 2, the upper half of the belt 140 extends directly from above the ring 130 and thus is connected to the axle of the rear wheel 120. Consequently, the upper half of the belt 140 is connected to the rear wheel 120 from the top surface 1111 of the chain stay 111. The lower half of the belt 140 is stretched along the second extension direction D2 by the roller 30 of the belt tensioner 1; consequently, the belt 140 extends obliquely from the bottom surface 1112 to the top surface 1111. After that, the belt 140 extends from the top surface 1111 and from above the roller 30 to the lateral platform 150 so as to connect to the rear wheel 120. Therefore, both the upper and lower halves of the belt 140 are connected to the rear wheel 120 from the top surface 1111, and thus the belt 140 need not connect to the rear wheel 120 from the bottom surface 1112 (where constituent elements of the bike 100 are so densely distributed that the passage through which the belt 140 can pass is narrow), thereby saving cost otherwise incurred by the structural design.

Furthermore, the user can rotate the second link 12 so as to adjust the overall height of the tensioner skeleton 10 such that the roller 30 varies in height and thus presses against or moves away from the belt 140. Therefore, the present disclosure is effective in changing the tension of the belt 140. Therefore, the present disclosure is effective in changing the tension of the belt 140.

Furthermore, the location of the tensioner skeleton 10 is not limited to the chain stay 111; for example, the first link 11 of the tensioner skeleton 10 can be pivotally connected to the seat stay 112, the second link 12 can be towards the chain stay 111, and the roller 30 contacts with the belt 140, and the vertical height of the contact part of the belt 140 is greater than a height of the top surface of the chain stay 111.

The present disclosure provides a bike and a belt tensioner to allow a belt to extend from above and thereby connect to a rear wheel. The present disclosure dispenses with the need to require the belt to connect to the rear wheel from below and thereby saves cost otherwise incurred in the structural design. Furthermore, the belt tensioner 1 adjusts the tension of the belt.

Although the present disclosure is disclosed above by embodiments, the embodiments are not restrictive of the present disclosure. Changes and modifications to the embodiments made by persons skilled in the art without departing from the spirit of the present disclosure must be deemed to fall within the scope of the present disclosure. Accordingly, the legal protection for the present disclosure should be defined by the appended claims.

What is claimed is:

1. A belt tensioner applied a bike, the bike comprising a frame and a belt, the frame comprising a chain stay and a seat stay, the chain stay and the seat stay respectively having a top surface and a bottom surface, the belt tensioner comprising:
   a tensioner skeleton pivotally connected to the chain stay, wherein an included angle is formed between the tensioner skeleton and the chain stay, wherein the tensioner skeleton further comprises a first link and a second link, the first link being disposed at the chain stay and having a first extension direction, and the second link comprising a first end pivotally connected to the first link, wherein the second link has a second extension direction when the first end is pivotally connected to the first link, and the included angle is formed between the first extension direction and the second extension direction;
   a roller pivotally connected to the tensioner skeleton and being in contact with the belt; and
   a tension regulator for pressing against the belt so as to adjust a tension of the belt, wherein the tension regulator is disposed at an end of the tensioner skeleton, and the end of the tensioner skeleton is positioned distal to the bottom surface of the chain stay, wherein a part of the belt is in contact with the tension regulator, and a vertical height of a contact part of the belt is greater than a height of the top surface of the chain stay.

2. The belt tensioner of claim 1, wherein the second link comprises a second end, and the second end is pivotally connected to the roller.

3. The belt tensioner of claim 2, wherein the tension regulator further comprises a positioning holder and an elevating stud, the positioning holder being connected to the second link, and the elevating stud being movable relative to the positioning holder and being able to increase the tension of the belt by moving upward to press against the belt.

4. The belt tensioner of claim 3, wherein the second link further comprises a through hole, and the elevating stud passes through the through hole to press against the belt.

5. The belt tensioner of claim 1, wherein the belt tensioner stretches the belt along the second extension direction such that the belt extends obliquely from the bottom surface of the chain stay to the top surface of the chain stay, wherein the part of the belt is in contact with the tension regulator and the vertical height of the contact part of the belt is greater than the height of the top surface of the chain stay when the tension regulator presses against the belt.

6. The belt tensioner of claim 1, wherein the included angle ranges from 10 to 80 degrees.

7. A bike, comprising a frame and a belt, the frame comprising a chain stay and a seat stay, the chain stay and the seat stay respectively having a top surface and a bottom surface the bike further comprising:
   a belt tensioner disposed at the chain stay and comprising:
   a tensioner skeleton, wherein the tensioner skeleton further comprises a first link and a second link, the first link being disposed at the chain stay and having a first extension direction, and the second link comprising a first end pivotally connected to the first link, wherein the second link has a second extension direction when the first end is pivotally connected to the first link, and the included angle is formed between the first extension direction and the second extension direction;
   a roller pivotally connected to the tensioner skeleton and being in contact with the belt; and
   a tension regulator for pressing against the belt so as to adjust a tension of the belt, wherein the tension regulator is disposed at an end of the tensioner skeleton, and the end of the tensioner skeleton is positioned distal to the bottom surface of the chain stay, wherein a part of the belt is in contact with the tension regulator and a vertical height of a contact part of the belt is greater than a height of the top surface of the chain stay when the tension regulator presses against the belt.

8. The bike of claim 7, wherein the second link comprises a second end, and the second end is pivotally connected to the roller.

9. The bike of claim 8, wherein the tension regulator further comprises a positioning holder and an elevating stud, the positioning holder being connected to the second link, and the elevating stud being movable relative to the positioning holder and being able to increase the tension of the belt by moving upward to press against the belt.

10. The bike of claim 9, wherein the second link further comprises a through hole, and the elevating stud passes through the through hole to press against the belt.

11. The bike of claim 8, wherein the belt tensioner stretches the belt along the second extension direction such that the belt extends obliquely from the bottom surface of the chain stay to the top surface of the chain stay, wherein the part of the belt is in contact with the tension regulator and a vertical height of the contact part of the belt is greater than a height of the top surface of the chain stay when the tension regulator presses against the belt.

12. The bike of claim 11, wherein the bike comprises a rear wheel and a lateral platform, and the belt connects to the rear wheel from the top surface to the lateral platform.

13. The bike of claim 7, wherein the included angle ranges from 10 to 80 degrees.